Jan. 28, 1936.  J. L. POTTER  2,029,188
REEL BASE PLATE FISHING ROD ATTACHING MEANS
Filed Nov. 23, 1934    2 Sheets-Sheet 1
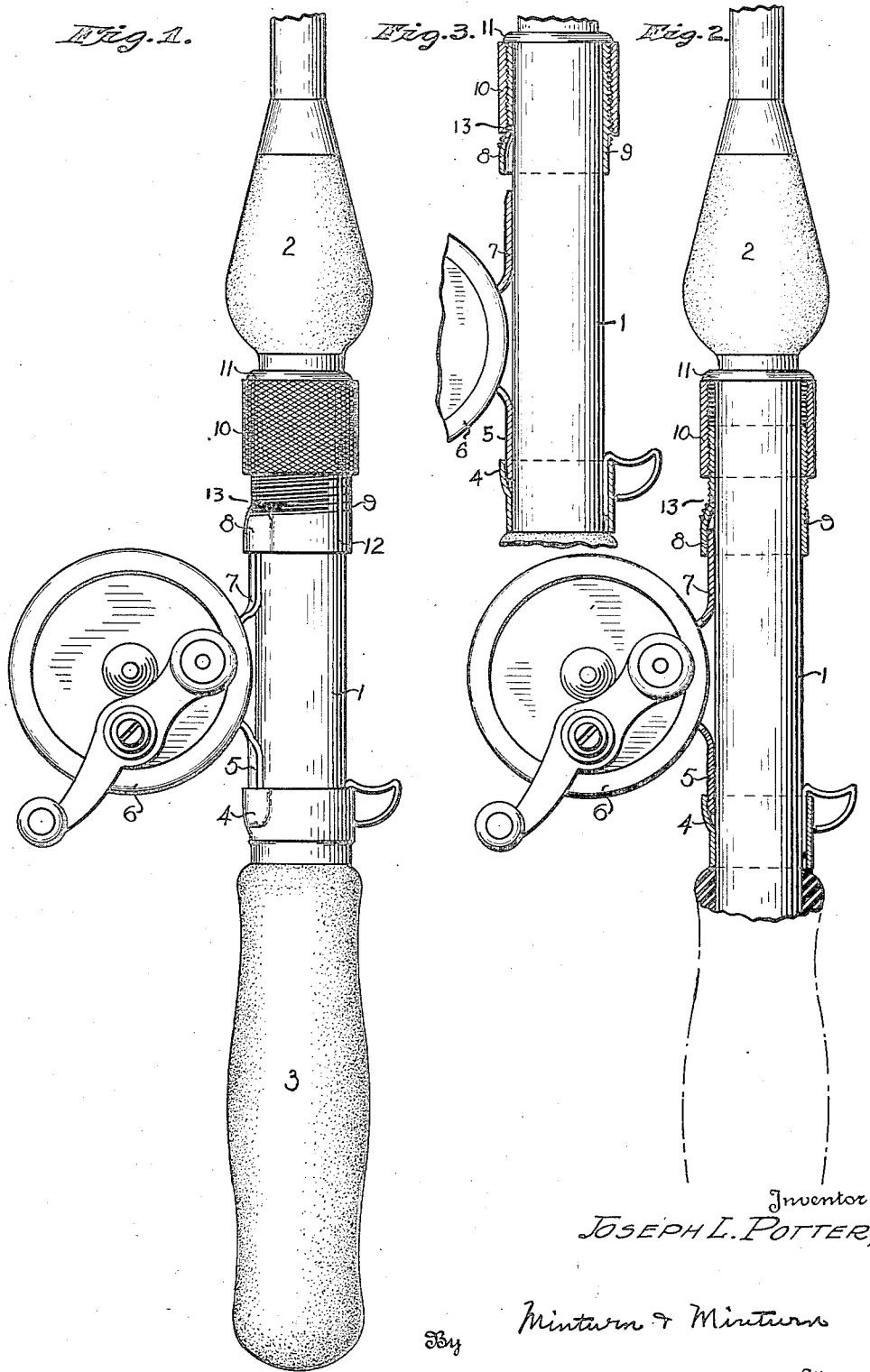
Inventor
JOSEPH L. POTTER,
By Minturn & Minturn
Attorney Jan. 28, 1936. J. L. POTTER 2,029,188
REEL BASE PLATE FISHING ROD ATTACHING MEANS
Filed Nov. 23, 1934 2 Sheets-Sheet 2
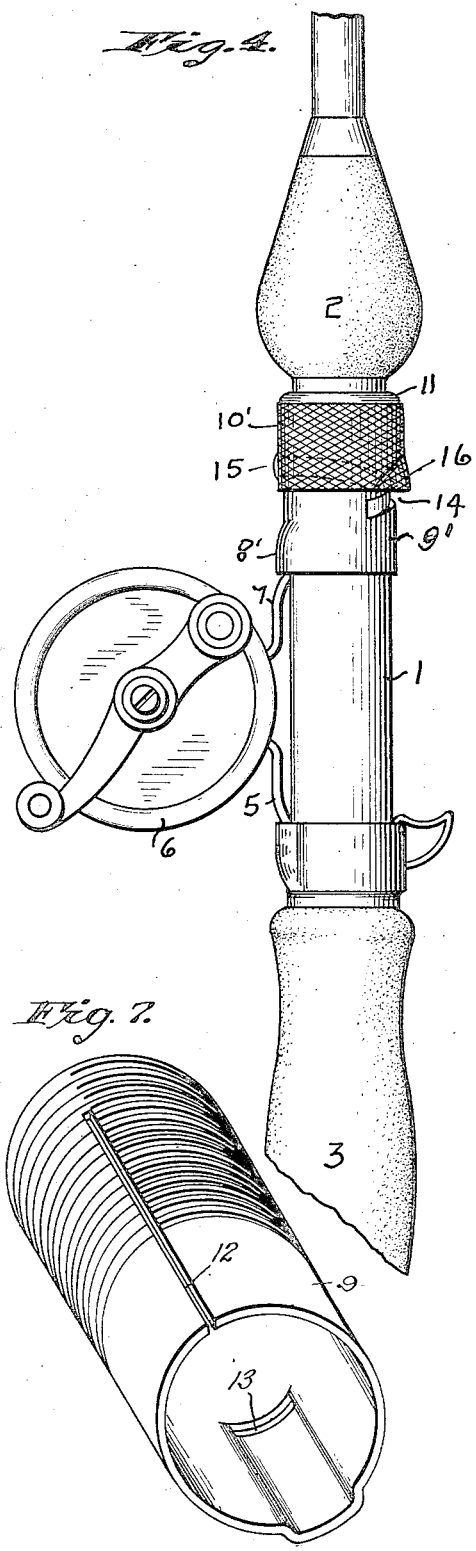
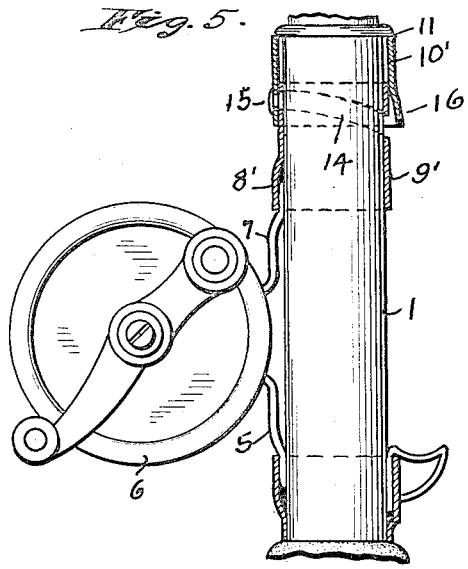
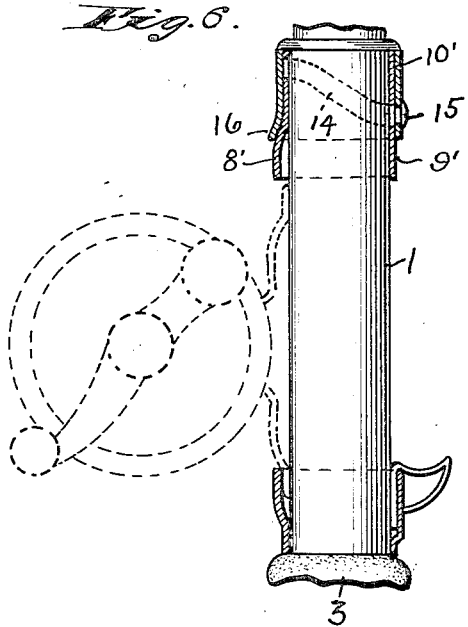
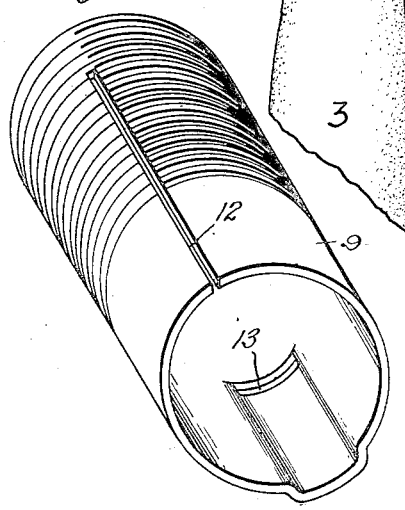
Inventor
JOSEPH L. POTTER,
By Minturn & Minturn
Attorney Patented Jan. 28, 1936

2,029,188

UNITED STATES PATENT OFFICE 2,029,188

REEL BASE-PLATE FISHING-ROD ATTACHING MEANS

Joseph L. Potter, Indianapolis, Ind.

Application November 23, 1934, Serial No. 754,498

9 Claims. (Cl. 43—22)

The object of this invention is to provide a movable sleeve on the tube of a fishing rod, with a socket adapted to receive one end of a reel baseplate and means bearing against a stop on the tube for forcing the sleeve and socket down on the base plate to tighten one end of the base plate in the socket in the sleeve and the other end in a fixed socket on the tube.

Another object is to avoid weakening the tube by cutting screw-threads or other cooperating means for a tightening member in the sleeve instead of in the tube, thereby permitting the use of thinner and therefore lighter and cheaper metal for the tube.

A further object is to provide a split base holding sleeve and a nut screwing on the sleeve to clamp the sleeve to the tube.

I accomplish the above and further objects of my invention which will appear from the following detailed description and reference to the accompanying drawings, in which:

Fig. 1 is a side elevation of the handle portion of a rod and reel embodying my invention;

Fig. 2 is a view of the same parts with the reel base-plate and attaching means in section, and the attaching means closed, the other parts being shown in elevation;

Fig. 3 shows the same sectioned parts open instead of closed;

Fig. 4 is a side elevation of a modified form of my invention closed, or in gripping position;

Fig. 5 is a fragment with the reel base attaching means in section and closed;

Fig. 6 is a like view showing the attaching means open; and

Fig. 7 is a detail in perspective of an attaching sleeve.

The smooth cylindrical tube 1 is provided with a forward handle grip 2 and a rear handle grip 3. Near the handle 3 is a hooded socket 4 which is stationary on the tube 1 and is of a size and shape to receive the rear end 5 of the base plate extension of a reel 6, both of usual construction.

The forward base-plate extension 7 is received in a hood 8 of a sleeve 9 making a sliding fit on the tube 1. The forward extension of the sleeve is screw-threaded, beginning at the forward end of the hood 8, and screwed on this threaded end of the sleeve is a sleeve or nut 10, with a knurled surface for easy manipulation.

The forward end of the tube 1 is rolled outwardly to form an outside bead which will act as a stop 11 to limit the movement of the nut on the sleeve in that direction.

The sleeve 9 has a split 12 extending forward from its rear end, and the sleeve has a cut 13 through the metal at the inner end of the socket.

The operation of my invention is as follows: With the parts in the positions shown in Fig. 3, wherein the forward ends of both sleeve 9 and sleeve or nut 10 contact the stop 11, the rear end 5 of the base plate extension is inserted in hooded socket 4 as far as it can be conveniently done by hand, and with the front end 7 contacting the tube 1, the sleeve 9 is turned to bring the hooded socket 8 in alignment with the end 7 and the sleeve and nut are then pushed toward the reel forcing the hooded socket 8 upon the end 7 far enough to prevent the rotation of the sleeve when the nut is rotated. At this time it is desirable to make sure that both end plates 5 and 7 of the reel base are fully and uniformly contacting the tube. The nut is then screwed out on the sleeve until it contacts the stop 11, whereupon a further rotation of the nut pushes the sleeve toward the reel and this rotation is continued until both end plates of the reel base are rigidly and firmly clamped between these hooded sockets and tube 1.

In some cases, as for light fishing, the nut and sleeve may be pushed down so the hooded socket 8 is covering the base plate end 7, and then by screwing the nut into contact with the sloping end of the socket 8 the sleeve, by reason of the split 12 will be contacted against the tube 1 sufficiently tight to hold the reel. This saves time in assembling and dismembering the parts and permits the use of a smaller reel base.

In order to increase the gripping action of the socket against the sleeve by the pressure of the nut when screwed upon the latter, a cut 13 will enable the wall of the socket to move in under this pressure of the nut against the end of the reel base.

In the modification shown in Figs. 4 to 6, inclusive, the sleeve 9', instead of being externally screw-threaded has a spiral slot 14 to receive a pin 15 seated in a sleeve 10'. The sleeve 10' preferably is bent out at 16 at the sloping end of the hooded socket 8' of the sleeve 9'.

The operation of this modified form is similar to that of the form shown in Figs. 1 to 3, inclusive, in that both sleeves 9' and 10' are pushed together onto the reel base end to hold the sleeve 9' from rotation and then the sleeve 10' is rotated on sleeve 9' telescoping them with relation to each other, and movement in one direction of the sleeves relative to each other pushes the sleeve 9' into contact at its forward end with the stop 11, and by further rotation of the sleeve 10' in the same direction, the hood of sleeve 9' is pushed tightly upon the reel base, clearance against the hooded socket 8' being afforded by the bent-out portion 16.

What I claim is:

1. A reel seat comprising a tube having an outside annular bead, means on the tube for receiving one end of a reel base, a sleeve slidably and rotatively mounted on the tube between the base of the reel and the annular bead, said sleeve having means to receive the other end of the reel base, threads on the sleeve, and a nut, threads on the nut engaging the threads on the sleeve, said nut adapted to contact the bead on the tube and force the sleeve and its reel base holding means toward the reel to clamp the reel base to the tube.

2. A reel seat comprising a tube, means on the tube for receiving one end of a reel base, a sleeve slidably and rotatably mounted on the tube, said sleeve having means at one end to receive the other end of the reel base and also having a split extending longitudinally from the same end as the reel base holding means, threads on the sleeve, and a nut having threads engaging the threads on the sleeve, screwed on the sleeve toward the reel to compress the sleeve at the split and clamp the sleeve to the tube.

3. A reel seat comprising a tube round in cross section having an outwardly projecting portion, means on the tube for receiving one end of a reel base, a sleeve slidably and rotatively mounted on the tube between the base of the reel and the projecting portion of the tube, said sleeve having outside threads and means to receive the other end of the reel base, and a nut having threads engaging the threads of the sleeve, said nut adapted to contact the projecting portion on the tube to force the sleeve and reel base receiving means toward the reel to clamp the reel base to the tube.

4. A reel seat comprising a cylindrical tube having an outwardly projecting portion to form a stop, means on the tube for receiving one end of a reel base, a sleeve slidably and rotatively mounted on the tube between the base of the reel and the stop, said sleeve having a hooded socket receiving the other end of the reel base, said socket sloping at its inner end and said sleeve having outside threads which extend up the sloping end of the socket, and a nut having threads engaging the threads of the sleeve, said nut adapted to contact the stop when screwed toward the stop and force the hood of the sleeve upon the end of the reel base and said nut being adapted to tighten the sleeve upon the tube when screwed in reverse direction upon the threaded portion of the hood.

5. A reel seat comprising a cylindrical tube having an end rolled out to form a stop, means on the tube for receiving one end of a reel base, a sleeve slidably and rotatively mounted on the tube between the base of the reel and the rolled-out stop, said sleeve having a hooded socket adapted to receive the other end of the reel base, said socket sloping at its inner end and said socket having outside threads, and a nut having threads engaging the threads of the sleeve and adapted to contact the rolled-out stop when screwed far enough in that direction and force the hooded socket upon the end of the reel-base.

6. A reel seat comprising a cylindrical tube having an outside stop, means on the tube for receiving one end of a reel base, a sleeve slidably and rotatively mounted on the tube between the reel and stop, said sleeve having a hooded socket receiving the other end of the reel base, said socket sloping at its end next to the nut and said sleeve having outside threads and also having slots in the end next to the reel, and a nut having threads engaging the threads of the sleeve and clamping the sleeve to the tube by the aid of the slots.

7. A reel seat comprising a tube having an outside annular bead, means on the tube for receiving one end of a reel base, a sleeve slidably and rotatively mounted on the tube and having means to receive the other end of the reel base, a second sleeve on the first sleeve slidable and rotatable therewith and adapted to contact the bead on the tube and means connecting the two sleeves to telescope them by rotation of the second sleeve on the first one, whereby the rotation of the second sleeve while in contact with the bead will push the second sleeve toward the reel.

8. A reel seat comprising a cylindrical tube having a stop and means for receiving one end of a reel base, a sleeve slidably and rotatively mounted on the tube between the reel and stop, said sleeve having a hooded socket and a spiral guide, and a second sleeve mounted on the first sleeve slidable and rotatable therewith and adapted to contact the stop on the tube and having a member projecting into the spiral guide on the first sleeve to move the first sleeve telescopically toward the reel by pushing against the stop when the second sleeve is rotated.

9. A reel comprising a cylindrical tube having a stop and means for receiving one end of a reel base, a sleeve slidably and rotatively mounted on the tube between the reel and stop, said sleeve having a spiral slot extending from near its lower end to near its upper end and having a hooded socket to receive the other end of the reel base, and a second sleeve mounted on the first sleeve and adapted to contact the stop on the tube and also having a pin extending into the spiral slot to move the first sleeve telescopically toward the reel by rotating the second sleeve while it is contacting the stop.

JOSEPH L. POTTER.